(12) United States Patent
Koelblin et al.

(10) Patent No.: US 11,257,607 B2
(45) Date of Patent: Feb. 22, 2022

(54) ELECTRIC CABLE WITH IMPROVED TEMPERATURE AGEING RESISTANCE

(71) Applicant: NEXANS, Courbevoie (FR)

(72) Inventors: Christian Koelblin, Meximieux (FR); Melek Maugin, Chassagny (FR); Gabriele Perego, Milan (IT); Valéry Alcaraz, Saint-Fons (FR)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 16/722,761

(22) Filed: Dec. 20, 2019

(65) Prior Publication Data
US 2020/0251244 A1    Aug. 6, 2020

(30) Foreign Application Priority Data
Dec. 21, 2018   (FR) ...................... 18 73939

(51) Int. Cl.
| H01B 3/00 | (2006.01) |
| H01B 9/02 | (2006.01) |
| H01B 3/30 | (2006.01) |
| C08L 23/14 | (2006.01) |

(52) U.S. Cl.
CPC .............. *H01B 3/307* (2013.01); *C08L 23/14* (2013.01); *H01B 9/027* (2013.01); *C08L 2203/202* (2013.01); *C08L 2205/025* (2013.01); *C08L 2205/03* (2013.01); *C08L 2207/02* (2013.01)

(58) Field of Classification Search
CPC ............................... H01B 9/027; H01B 3/004
See application file for complete search history.

(56) References Cited

U.S. PATENT DOCUMENTS

| 2013/0161059 A1 | 6/2013 | Steffl et al. |
| 2013/0233604 A1 | 9/2013 | Perego |
| 2015/0228376 A1* | 8/2015 | Ranganathan ........ B29C 48/022 428/391 |
| 2019/0040243 A1 | 2/2019 | Yang et al. |

OTHER PUBLICATIONS

International Search Report dated Oct. 25, 2019.

* cited by examiner

*Primary Examiner* — Chau N Nguyen
(74) *Attorney, Agent, or Firm* — Sofer & Haroun, LLP

(57) ABSTRACT

An electric cable has at least one semi-conductive layer obtained from a polymer composition having at least one polypropylene-based thermoplastic polymer material, at least one first antioxidant and at least one metal deactivator.

17 Claims, 1 Drawing Sheet

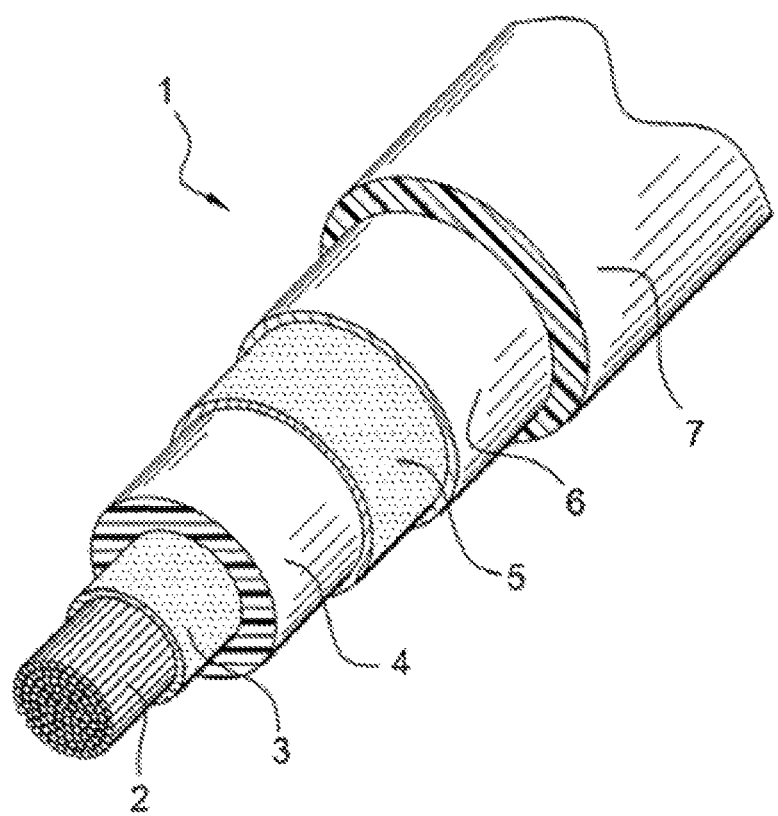

ELECTRIC CABLE WITH IMPROVED TEMPERATURE AGEING RESISTANCE

RELATED APPLICATION

This application claims the benefit of French Patent Application No. 18 73939, filed on Dec. 21, 2018, the entirety of which is incorporated by reference.

BACKGROUND

Field of the Invention

The invention concerns an electric cable comprising at least one semi-conductive layer obtained from a polymer composition comprising at least one polypropylene-based thermoplastic polymer material, at least one first antioxidant and at least one metal deactivator.

The invention typically but not exclusively applies to electric cables intended for power transmission, in particular medium-voltage (in particular from 6 to 45-60 kV) or high-voltage (in particular above 60 kV, and up to 400 kV) power cables, whether direct current or alternating current, in the fields of air, underwater, land or aeronautical power transmission. The invention applies in particular to electric cables with improved temperature ageing resistance.

Description of Related Art

The mechanical properties at high temperatures of a propylene polymer-based composition can be altered by the presence of conductive fillers such as carbon black, even in small amounts (e.g. 1-5% by weight of carbon black, relative to the total weight of the composition). Consequently, the use of larger amounts, particularly in semi-conductive layers of propylene polymer-based cables, poses problems. This degradation phenomenon in propylene polymer-based semi-conductive layers increases when the conductive fillers include chemical impurities since they accelerate the thermal degradation. In addition, the thermal stability of propylene polymers is limited with respect to high temperatures such as those generally used in forming processes, so it is recommended not to exceed temperatures above about 230° C. However, it is difficult to follow such recommendations in some industrial configurations.

There is therefore a need for propylene polymer-based compositions for cable semi-conductive layers with improved thermal stability.

From EP1634896 A1 is known an electric cable semi-conductive layer obtained from a composition comprising a copolymer of ethylene and butyl acrylate, carbon black and a polymer of trimethyl-2,2,4-dihydro-1,2-quinoline as antioxidant. However, this composition is not optimized to obtain good temperature ageing resistance. In addition, it is known that propylene polymer-based compositions for cable semi-conductive layers are more difficult to stabilize thermally than ethylene polymer-based compositions.

OBJECTS AND SUMMARY

The aim of the present invention is therefore to overcome the disadvantages of prior art techniques by offering a propylene polymer-based electric cable, in particular a medium- or high-voltage cable, which has significantly improved temperature ageing resistance, preferably while guaranteeing good electrical properties.

The aim is achieved by the invention which will be described below.

The first subject of the invention is an electric cable comprising at least one elongated electrically conductive element, and at least one semi-conductive layer surrounding said elongated electrically conductive element, characterized in that the semi-conductive layer is obtained from a polymer composition comprising at least one polypropylene-based thermoplastic polymer material, at least one first antioxidant, and at least one metal deactivator.

Thus, thanks to the presence of at least one first antioxidant, and at least one metal deactivator within a polypropylene-based semi-conductive layer of an electric cable, the temperature ageing resistance is significantly improved, preferably while guaranteeing good electrical properties. Thus, the mixture of at least one first antioxidant and at least one metal deactivator protects the polypropylene-based semi-conductive layer.

The First Antioxidant

The first antioxidant can be selected from hindered phenols, aromatic amines, and nitrogen-containing aromatic heterocyclics, and preferably from hindered phenols.

Hindered phenols are generally phenols substituted in the ortho position by one or more hydrocarbon groups.

Aromatic amines generally include at least one amine function linked to at least one aromatic ring such as phenyl.

Nitrogen-containing aromatic heterocyclics generally include at least one aromatic heterocycle containing one or more (e.g. two) nitrogen atoms in the aromatic heterocycle.

The polymer composition can comprise at least about 0.3% by weight, preferably at least about 0.5% by weight, and particularly preferably at least about 0.75% by weight of the first antioxidant, based on the total weight of the polymer composition.

The polymer composition can comprise at most about 2.5% by weight, preferably at most about 2.0% by weight, and particularly preferably at most about 1.5% by weight of the first antioxidant, based on the total weight of the polymer composition.

Indeed, an amount greater than 2.5% can induce the appearance of antioxidant exudation phenomena. In addition, high amounts of antioxidants can increase the cost of producing said cable.

Examples of hindered phenols include pentaerythritol tetrakis(3-(3,5-di-tert-butyl-4-hydroxyphenyl)propionate) (Irganox® 1010), octadecyl 3-(3,5-di-tert-butyl-4-hydroxyphenyl)propionate (Irganox® 1076), 1,3,5-trimethyl-2,4,6-tris(3,5-di-tert-butyl-4-hydroxybenzyl)benzene (Irganox® 1330), 4,6-bis(octylthiomethyl)-o-cresol (Irgastab® KV10 or Irganox® 1520), 2,2'-thiobis(6-tert-butyl-4-methylphenol) (Irganox® 1081), 2,2'-thiodiethylene bis[3-(3,5-di-tert-butyl-4-hydroxyphenyl)propionate] (Irganox® 1035), 2,2'-methylenebis(6-tert-butyl-4-methylphenol) or tris (3,5-di-tert-butyl-4-hydroxybenzyl) isocyanurate (Irganox® 3114).

Examples of aromatic amines include phenylene diamines (e.g. paraphenylene diamines such as 1PPD or 6PPD), styrene diphenylamine, diphenylamines, or 4-(1-methyl-1-phenylethyl)-N-[4-(1-methyl-1-phenylethyl)phenyl]aniline (Naugard 445).

Examples of nitrogen-containing aromatic heterocyclics include mercapto benzimidazoles or quinoline derivatives such as polymerized 2,2,4-trimethyl-1,2 dihydroquinolines (TMQs), and preferably mercapto benzimidazoles.

TMQs can have different grades, namely:
 a "standard" grade with a low degree of polymerization,
  i.e. with a residual monomer content greater than 1% by weight and having a residual NaCl content ranging from 100 ppm to more than 800 ppm (parts per million by weight);

a "high degree of polymerization" grade with a high degree of polymerization, i.e. with a residual monomer content of less than 1% by weight and having a residual NaCl content ranging from 100 ppm to more than 800 ppm;

a "low residual salt content" grade with a residual NaCl content of less than 100 ppm.

The Metal Deactivator

The metal deactivator is different from the first antioxidant.

The metal deactivator can be selected from nitrogen-containing aromatic heterocycles, and aromatic compounds comprising at least one function —NH—C(=O)—, and preferably from aromatic compounds comprising at least one function —NH—C(=O)—. The presence of the oxygen in the metal deactivator is important to durably enable immobilization of metallic ions.

The metal deactivator is preferably different from a hindered amine. In other words, the metal deactivator preferably does not comprise one or more tetramethylpiperidine groups.

Examples of nitrogen-containing aromatic heterocyclics include quinoline derivatives such as polymerized 2,2,4-trimethyl-1,2-dihydroquinolines (TMQs).

TMQs can have different grades, namely:

a "standard" grade with a low degree of polymerization, i.e. with a residual monomer content greater than 1% by weight and having a residual NaCl content ranging from 100 ppm to more than 800 ppm (parts per million by weight);

a "high degree of polymerization" grade with a high degree of polymerization, i.e. with a residual monomer content of less than 1% by weight and having a residual NaCl content ranging from 100 ppm to more than 800 ppm;

a "low residual salt content" grade with a residual NaCl content of less than 100 ppm.

Examples of aromatic compounds comprising at least one function —NH—C(=O)— are those comprising two functions —NH—C(=O)—, preferably comprising two functions —NH—C(=O)— covalently linked, and more particularly preferably comprising a divalent group —NH—C(=O)—C(=O)—NH— or —C(=O)—NH—NH—C(=O)—, such as 2,2' oxamidobis-[ethyl-3-[ethyl-3-(3,5-di-tert-butyl-4-hydroxyphenyl)propionate] (Naugard XL-1), 2',3-bis[[3-[3,5-di-tert-butyl-4-hydroxyphenyl]propionyl]] propionohydrazide or 1,2-bis(3,5-di-tert-butyl-4-hydroxyhydrocinnamoyl)hydrazine (Irganox® 1024 or Irganox® MD 1024), or oxalyl bis(benzylidenehydrazide) (OABH).

The polymer composition can comprise at least about 0.2% by weight, preferably at least about 0.4% by weight, and particularly preferably at least about 0.6% by weight of the metal deactivator, based on the total weight of the polymer composition.

The polymer composition can comprise at most about 1.5% by weight, preferably at most about 1.0% by weight, and particularly preferably at most about 0.75% by weight of the metal deactivator, based on the total weight of the polymer composition.

The combination of a metal deactivator and a first antioxidant provides good thermal stability of the polypropylene-based semi-conductive layer.

The polymer composition comprises in particular at least one conductive filler, in particular in sufficient amount to render the layer semi-conductive.

Thus, the mixture of at least one first antioxidant and at least one metal deactivator protects the polypropylene-based semi-conductive layer despite the presence of said conductive filler(s) that can be included in said semi-conductive layer.

The polymer composition can comprise at least about 6% by weight of conductive filler, preferably at least about 15% by weight of conductive filler, and even more preferentially at least about 25% by weight of conductive filler, based on the total weight of the polymer composition.

The polymer composition can comprise at most about 45% by weight of conductive filler, and preferably at most about 40% by weight of conductive filler, based on the total weight of the polymer composition.

The conductive filler is preferably an electrically conductive filler.

The conductive filler can be selected advantageously from carbon blacks, graphites, and one of their mixtures.

The metal deactivator enables, in particular, protection of the semi-conductive layer against metal ions that can be found in conductive fillers in the form of traces, but also in the elongated electrically conductive element and/or in the metal shield of the cable of the invention.

The Polypropylene-Based Thermoplastic Polymer Material

The polypropylene-based thermoplastic polymer material can include a propylene homopolymer or copolymer $P_1$, and preferably a propylene copolymer $P_1$.

The propylene homopolymer $P_1$ preferably has an elastic modulus ranging from about 1250 to 1600 MPa.

The propylene homopolymer $P_1$ can represent at least about 10% by weight, and preferably about 15 to 30% by weight, based on the total weight of the polypropylene-based thermoplastic polymer material.

Examples of propylene copolymers $P_1$ include propylene and olefin copolymers, with olefin being selected in particular from ethylene and an olefin $\alpha_1$ different from the propylene.

The ethylene or olefin $\alpha_1$ different from the propylene of the propylene-olefin copolymer preferably represents at most about 15% by mole, and more preferably at most about 10% by mole, based on the total number of moles of propylene-olefin copolymer.

The olefin $\alpha_1$ different from the propylene can have the formula $CH_2=CH—R^1$, wherein $R^1$ is a linear or branched alkyl group having from 2 to 12 carbon atoms, particularly selected from the following olefins al: 1-butene, 1-pentene; 4-methyl-1-pentene, 1-hexene, 1-octene, 1-decene, 1-dodecene, and one of their mixtures.

Propylene and ethylene copolymers are preferred as propylene copolymers $P_1$.

The propylene copolymer $P_1$ can be a random propylene copolymer or a heterophasic propylene copolymer.

In the invention, the random propylene copolymer $P_1$ preferably has an elastic modulus ranging from about 600 to 1200 MPa.

One example of a random propylene copolymer is the one marketed by Borealis with the product name Bormed® RB 845 MO.

The heterophasic propylene copolymer can comprise a thermoplastic phase of propylene type and a thermoplastic elastomer phase of ethylene-olefin $\alpha_2$ copolymer type.

The olefin $\alpha_2$ of the thermoplastic elastomer phase of the heterophasic copolymer can be propylene.

The thermoplastic elastomer phase of the heterophasic copolymer can represent at least about 20% by weight, and preferably at least about 45% by weight, based on the total weight of the heterophasic copolymer.

The heterophasic propylene copolymer preferably has an elastic modulus ranging from 50 to 1200 MPa, and particularly preferably: either an elastic modulus ranging from about 50 to 550 MPa, and more particularly preferably ranging from about 50 to 250 MPa; or an elastic modulus ranging from about 600 to 1200 MPa.

One example of a heterophasic copolymer is the heterophasic copolymer marketed by LyondellBasell with the product name Adflex® Q 200 F, or the heterophasic copolymer marketed by LyondellBasell with the product name EP® 2967.

The propylene homopolymer or copolymer $P_1$ can have a melting temperature greater than about 110° C., preferably greater than about 130° C., particularly preferably greater than or equal to about 140° C., and more particularly preferably ranging from about 140 to 170° C.

The propylene homopolymer or copolymer $P_1$ can have a melting enthalpy ranging from about 20 to 100 J/g.

In particular, the propylene homopolymer $P_1$ has a melting enthalpy ranging from about 80 to 90 J/g.

The random propylene copolymer $P_1$ can have a melting enthalpy ranging from about 40 to 80 J/g.

The heterophasic propylene copolymer $P_1$ can have a melting enthalpy ranging from about 20 to 50 J/g.

The propylene homopolymer or copolymer $P_1$ can have a melt flow index ranging from 0.5 to 3 g/10 min, measured at about 230° C. with a load of about 2.16 kg according to ASTM D1238-00.

The random propylene copolymer $P_1$ can have a melt flow index ranging from 1.2 to 2.5 g/10 min, and preferably from 1.5 to 2.5 g/10 min, measured at about 230° C. with a load of about 2.16 kg according to ASTM D1238-00.

The heterophasic propylene copolymer $P_1$ can have a melt flow index ranging from 0.5 to 1.5 g/10 min, and preferably from 0.5 to 1.4 g/10 min, measured at about 230° C. with a load of about 2.16 kg according to ASTM D1238-00.

The polypropylene-based thermoplastic polymer material can comprise several different propylene polymers, such as several different propylene homopolymers $P_1$, at least one propylene homopolymer $P_1$ and at least one propylene copolymer $P_1$, or several different propylene copolymers $P_1$.

The polypropylene-based thermoplastic polymer material preferably comprises at least about 50% by weight, preferably about 55 to 90% by weight, and particularly preferably about 60 to 90% by weight, of propylene polymer(s), based on the total weight of the polypropylene-based thermoplastic polymer material.

When the polypropylene-based thermoplastic polymer material comprises several different propylene copolymers $P_1$, it preferably comprises two different propylene copolymers $P_1$, said propylene copolymers $P_1$ being as defined above.

In particular, the polypropylene-based thermoplastic polymer material can include a random propylene copolymer (as first propylene copolymer $P_1$) and a heterophasic propylene copolymer (as second propylene copolymer $P_1$), or two different heterophasic propylene copolymers.

When the polypropylene-based thermoplastic polymer material comprises a random propylene copolymer and a heterophasic propylene copolymer, said heterophasic propylene copolymer preferably has an elastic modulus ranging from about 600 to 1200 MPa.

According to an embodiment of the invention, the two heterophasic propylene copolymers have a different elastic modulus. Preferably, the polypropylene-based thermoplastic polymer material comprises a first heterophasic propylene copolymer having an elastic modulus ranging from about 50 to 550 MPa, and particularly preferably ranging from about 50 to 250 MPa; and a second heterophasic propylene copolymer having an elastic modulus ranging from about 600 to 1200 MPa.

Advantageously, the first and second heterophasic propylene copolymers have a melt flow index as defined in the invention.

These combinations of propylene copolymers $P_1$ can advantageously improve the mechanical properties of the semi-conductive layer. In particular, the combination makes it possible to obtain optimized mechanical properties of the semi-conductive layer, in particular in terms of elongation at break and flexibility; and/or form a more homogeneous semi-conductive layer, in particular to promote the dispersion of the dielectric liquid in the polypropylene-based thermoplastic polymer material of said semi-conductive layer.

According to a preferred embodiment of the invention, the propylene copolymer $P_1$ or the propylene copolymers $P_1$ when there are several of them, represent(s) at least about 50% by weight, preferably about 55 to 90% by weight, and more preferably about 60 to 90% by weight, based on the total weight of the polypropylene-based thermoplastic polymer material.

The random propylene copolymer $P_1$ can represent at least about 20% by weight, and preferably about 30 to 70% by weight, based on the total weight of the polypropylene-based thermoplastic polymer material.

The heterophasic propylene copolymer $P_1$, or heterophasic propylene copolymers $P_1$ when there are several of them, can represent from about 5 to 95% by weight, preferably about 50 to 90% by weight, and particularly preferably about 60 to 80% by weight, based on the total weight of the polypropylene-based thermoplastic polymer material.

The polypropylene-based thermoplastic polymer material can further comprise an olefin homopolymer or copolymer $P_2$, the olefin being selected in particular from ethylene and an olefin $\alpha_3$ having the formula $CH_2=CH-R^2$, wherein $R^2$ is a linear or branched alkyl group having from 1 to 12 carbon atoms.

Said homopolymer or a copolymer of olefin $\alpha_2$ is preferably different from said propylene homopolymer or copolymer $P_1$.

The olefin $\alpha_3$ is preferably selected from the following olefins: propylene, 1-butene, isobutylene, 1-pentene, 4-methyl-1-pentene, 1-hexene, 1-octene, 1-decene, 1-dodecene, and one of their mixtures.

The olefin $\alpha_3$ of propylene, 1-hexene or 1-octene type is particularly preferred.

According to an advantageous embodiment of the invention, $R^2$ is a linear or branched alkyl group having from 2 to 8 carbon atoms.

The combination of polymers $P_1$ and $P_2$ makes it possible to obtain a thermoplastic polymer material with good mechanical properties, particularly in terms of elastic modulus, and good electrical properties.

The olefin homopolymer or copolymer $P_2$ is preferably an ethylene polymer.

The ethylene polymer can be an ethylene or low-density polyethylene polymer, a medium-density polyethylene, or a high-density polyethylene, and preferably a linear low-density polyethylene; in particular according to ISO 1183A (at a temperature of 23° C.).

In the present invention, the term "low density" means having a density ranging from about 0.91 to 0.925, said density being measured according to ISO 1183A (at a temperature of 23° C.).

In the present invention, the term "medium density" means having a density ranging from about 0.926 to 0.940, said density being measured according to ISO 1183A (at a temperature of 23° C.).

In the present invention, the term "high density" means having a density ranging from 0.941 to 0.965, said density being measured according to ISO 1183A (at a temperature of 23° C.).

According to a preferred embodiment of the invention, the olefin homopolymer or copolymer $P_2$ represents about 5 to 50% by weight, and more preferably about 10 to 40% by weight, based on the total weight of the polypropylene-based thermoplastic polymer material.

According to a particularly preferred embodiment of the invention, the polypropylene-based thermoplastic polymer material comprises two propylene copolymers $P_1$ such as a random propylene copolymer and a heterophasic propylene copolymer or two different heterophasic propylene copolymers; and an olefin homopolymer or copolymer $P_2$ such as an ethylene polymer. This combination of propylene copolymers $P_1$ and an olefin homopolymer or copolymer $P_2$ further improves the mechanical properties of the semi-conductive layer, while ensuring good thermal conductivity.

The thermoplastic polymer material preferably comprises at least one propylene polymer having a Vicat temperature of at least 90° C., more preferably of at least 110° C., and even more preferably of at least 130° C. The propylene polymer having such a Vicat temperature is preferably the major polymer in the thermoplastic polymer material.

According to a preferred embodiment, the propylene polymer having such a Vicat temperature is a random copolymer of propylene as defined in the invention.

In the present invention, the Vicat temperature, or in other words the Vicat softening point (also known as the Vicat softening temperature) may be readily determined according to the standard ISO 306 Method A (2013).

The thermoplastic polymer material of the polymer composition of the semi-conductive layer of the cable of the invention is preferably heterophasic (i.e. it comprises several phases). The presence of several phases generally results from the mixing of two different polyolefins, such as a mixture of different propylene polymers or a mixture of a propylene polymer and an ethylene polymer.

The thermoplastic polymer material as defined in the invention represents the polymer material of the polymer composition of the invention.

The polypropylene-based thermoplastic polymer material preferably comprises an amount of less than about 10% by weight of polar polymer(s), with respect to the total weight of the polypropylene-based thermoplastic polymer material; more preferably an amount of less than about 5% by weight of polar polymer(s), with respect to the total weight of the polypropylene-based thermoplastic polymer material; and even more preferably does not comprise polar polymer(s).

In the present invention, the expression "polar" signifies that the polymer of this type comprises polar functions, such as for example acetate, acrylate, hydroxyl, nitrile, carboxyl, carbonyl, ether, ester groups, or any other groups of a polar character well known in the prior art. For example, a polar polymer can be a polymer selected from the ethylene copolymers of the type of copolymer of ethylene and vinyl acetate (EVA), copolymer of ethylene and butyl acrylate (EBA), copolymer of ethylene and ethyl acrylate (EEA), copolymer of ethylene and methyl acrylate (EMA), or copolymer of ethylene and acrylic acid (EAA).

The Dielectric Liquid

The polymer composition of the invention can also include a dielectric liquid, in particular forming an intimate mixture with the thermoplastic polymer material. The presence of the dielectric fluid enables to obtain better dielectric properties (i.e. better electrical insulation), and notably better dielectric strength of the layer obtained from the polymer composition. It can also allow improving mechanical properties and/or ageing resistance of said layer.

Examples of dielectric liquids include mineral oils (e.g. naphthenic oils, paraffinic oils or aromatic oils), vegetable oils (e.g. soybean oil, linseed oil, rapeseed oil, corn oil or castor oil) or synthetic oils such as aromatic hydrocarbons (alkylbenzenes, alkylnaphthalenes, alkylbiphenyls, alkyd-iaryl ethylenes, etc.), silicone oils, ether-oxides, organic esters or aliphatic hydrocarbons.

According to a particular embodiment, the dielectric liquid represents about 1% to 20% by weight, preferably about 2 to 15% by weight, and more preferably about 3 to 12% by weight, based on the total weight of the thermoplastic polymer material.

The dielectric liquid can include a mineral oil and at least one polar compound of type benzophenone, acetophenone or one of their derivatives.

In this embodiment, the dielectric liquid can comprise at least about 70% by weight of mineral oil, preferably at least about 80% by weight of mineral oil, and particularly preferably at least about 90% by weight of mineral oil based on the total weight of the dielectric liquid.

The mineral oil is generally liquid at about 20-25° C.

The mineral oil can be selected from naphthenic oils and paraffinic oils.

The mineral oil is obtained from the refining of a petroleum crude oil.

According to a particularly preferred embodiment of the invention, the mineral oil comprises a paraffinic carbon (Cp) content ranging from about 45 to 65% atomic, a naphthenic carbon (Cn) content ranging from about 35 to 55% atomic and an aromatic carbon (Ca) content ranging from about 0.5 to 10% atomic.

In a particular embodiment, the polar compound of type benzophenone, acetophenone or one of their derivatives represents at least about 2.5% by weight, preferably at least about 3.5% by weight, and even more preferentially at least about 4% by weight, based on the total weight of the dielectric liquid.

According to a preferred embodiment of the invention, the polar compound of type benzophenone, acetophenone or one of their derivatives is selected from benzophenone, dibenzosuberone, fluorenone and anthrone. Benzophenone is particularly preferred.

Second Antioxidant

The polymer composition can also include a second antioxidant different from the first antioxidant.

The second antioxidant can be selected from sulphur antioxidants and phosphorus antioxidants.

Examples of sulphur antioxidants include thioethers such as didodecyl-3,3'-thiodipropionate (Irganox® PS800), distearyl thiodipropionate or dioctadecyl-3,3'-thiodipropionate (Irganox® PS802), bis[2-methyl-4-{3-n-alkyl ($C_{12}$ or $C_{14}$) thiopropionyloxy}-5-tert-butylphenyl]sulphide, thiobis-[2- tert-butyl-5-methyl-4,1-phenylene]bis[3-(dodecylthio)propionate], or 4,6-bis(octylthiomethyl)-o-cresol (Irganox® 1520 or Irgastab® KV10).

Examples of phosphorus antioxidants include phosphites or phosphonates, such as tris(2,4-di-tert-butyl-phenyl)phosphite (Irgafos® 168) or bis(2,4-di-tert-butylphenyl)pentaerythritol diphosphite (Ultranox® 626).

The polymer composition can comprise at least about 0.2% by weight, preferably at least about 0.3% by weight, and particularly preferably at least about 0.5% by weight of the second antioxidant, based on the total weight of the polymer composition.

The polymer composition can comprise at most about 2.0% by weight, preferably at most about 1.5% by weight, and particularly preferably at most about 1.0% by weight of the second antioxidant, based on the total weight of the polymer composition.

According to a particularly preferred embodiment of the invention, the first antioxidant, the second antioxidant and the metal deactivator represent at least about 0.6% by weight, preferably at least about 0.9% by weight, and particularly preferably at least about 1.2% by weight, based on the total weight of the polymer composition.

According to a particularly preferred embodiment of the invention, the first antioxidant, the second antioxidant and the metal deactivator represent at most about 2.5% by weight, preferably at most about 2.0% by weight, and particularly preferably at most about 1.5% by weight, based on the total weight of the polymer composition.

Additives

The thermoplastic polymer material can also include one or more additives.

Additives are well known to the skilled person and can be selected from implementation-enhancing agents such as lubricants, compatibilizers, or coupling agents, anti-UV agents, compounds to reduce water treeing, pigments, and one of their mixtures.

The thermoplastic polymer material can typically comprise about 0.01 to 5% by weight, and preferably about 0.1 to 2% by weight of additives, based on the total weight of the thermoplastic polymer material.

The polymer composition of the semi-conductive layer of the invention is a thermoplastic polymer composition. It is therefore not curable.

In particular, the polymer composition does not include crosslinking agents, silane coupling agents, peroxides and/or additives that allow crosslinking. Indeed, such agents degrade the polypropylene-based thermoplastic polymer material.

The polymer composition is preferably recyclable.

The composition can also include inert inorganic fillers such as chalk, kaolin or talc; and/or halogen-free mineral fillers intended to improve the fire performance of the polymer composition.

Inert inorganic fillers and/or halogen-free mineral fillers can represent at most about 30% by weight, preferably at most about 20% by weight, and particularly preferably at most about 10% by weight, and more particularly preferably at most about 5% by weight, based on the total weight of the polymer composition.

In order to guarantee a so-called halogen-free flame retardant (HFFR) electric cable, the cable of the invention does not preferentially include halogenated compounds. These halogenated compounds can be of any kind, such as fluorinated polymers or chlorinated polymers such as polyvinyl chloride (PVC), halogenated plasticizers, halogenated mineral fillers, etc.

The polymer composition can be prepared by mixing the polypropylene-based thermoplastic polymer material with at least one first antioxidant as defined in the invention, a metal deactivator as defined in the invention, optionally a second antioxidant as defined in the invention, optionally a dielectric liquid and optionally one or more additives as defined in the invention.

The Semi-Conductive Layer and the Cable

The semi-conductive layer of the cable of the invention is a non-crosslinked layer or, in other words, a thermoplastic layer.

In the invention, the term "non-crosslinked layer" or "thermoplastic layer" means a layer whose gel rate according to ASTM D2765-01 (xylene extraction) is at most about 30%, preferably at most about 20%, particularly preferably at most about 10%, more particularly preferably at most about 5%, and even more particularly preferably 0%.

In an embodiment of the invention, the semi-conductive layer, preferably non-crosslinked, has a tensile strength before temperature ageing of at least about 12.5 MPa, preferably at least about 15 MPa, and particularly preferably of at least about 20 MPa.

In an embodiment of the invention, the semi-conductive layer, preferably non-crosslinked, has a tensile strength after temperature ageing of at least about 12.5 MPa, preferably at least about 15 MPa, and particularly preferably of at least about 20 MPa.

The tensile strength is measured by an H2 dumbbell sample tensile test, in particular at a tensile speed of 25 mm/min.

In an embodiment of the invention, the semi-conductive layer, preferably non-crosslinked, has an elongation at break before temperature ageing of at least about 150%, preferably at least about 250%, and particularly preferably of at least about 350%.

In the invention, temperature ageing is preferably carried out at a temperature of at least 135° C., for example for 240 hours.

In an embodiment of the invention, the semi-conductive layer, preferably non-crosslinked, has an elongation at break after temperature ageing of at least about 150%, preferably at least about 250%, and particularly preferably of at least about 350%.

Elongation at break is measured by an H2 dumbbell sample tensile test, in particular at a tensile speed of 25 mm/min.

In a particularly preferred embodiment of the invention, the semi-conductive layer, preferably non-crosslinked, exhibits a reduction in tensile strength after temperature ageing of at most about 40%, preferably at most about 30%, and particularly preferably of at most about 25%.

In a particularly preferred embodiment of the invention, the semi-conductive layer, preferably non-crosslinked, exhibits a reduction in elongation at break after temperature ageing of at most about 50%, preferably at most about 40%, and particularly preferably of at most about 30%.

The semi-conductive layer of the cable of the invention is preferably a recyclable layer.

The semi-conductive layer of the invention can be an extruded layer, in particular by processes well known to the skilled person.

The semi-conductive layer has a variable thickness depending on the type of cable being considered. In particular, when the cable according to the invention is a medium-voltage cable, the thickness of the semi-conductive layer is typically about 0.3 to 1.5 mm, and more particularly about 0.5 mm. When the cable according to the invention is a high-voltage cable, the thickness of the semi-conductive layer typically varies from 1.0 to 4 mm (for voltages of about 150 kV) and up to thicknesses of about 3 to 5 mm for voltages above 150 kV (very-high-voltage cables). The above-mentioned thicknesses depend on the size of the elongated electrically conductive element.

In the present invention, "semi-conductive layer" means a layer whose electrical conductivity can be strictly greater than $1.10^{-8}$ S/m (siemens per metre), preferably at least $1.10^{-3}$ S/m, and preferably can be less than $1.10^{3}$ S/m (measured at 25° C. in direct current).

The semi-conductive layer of the invention can include at least one polypropylene-based thermoplastic polymer material, at least one first antioxidant, at least one metal deactivator, optionally a second antioxidant, optionally one or more additives, and optionally at least one conductive filler, said ingredients being as defined in the invention.

The proportions of the different ingredients in the semi-conductive layer can be identical to those described in the invention for the same ingredients in the polymer composition.

The elongated electrically conductive element can be a single-strand conductor such as a metal wire or a multi-strand conductor such as a plurality of optionally twisted metal wires.

The elongated electrically conductive element can be made of aluminium, aluminium alloy, copper, copper alloy, or one of their combinations.

The cable can also include an electrically insulating layer.

In the present invention, "electrically insulating layer" means a layer whose electrical conductivity cannot exceed $1.10^{-8}$ S/m (siemens per metre), and preferably not more than $1.10^{-10}$ S/m (siemens per metre) (measured at 25° C. in direct current).

The electrically insulating layer has more particularly a lower electrical conductivity than the semi-conductive layer. More particularly, the electrical conductivity of the semi-conductive layer can be at least 10 times higher than the electrical conductivity of the electrically insulating layer, preferably at least 100 times higher than the electrical conductivity of the electrically insulating layer, and particularly preferably at least 1000 times higher than the electrical conductivity of the electrically insulating layer.

The electrically insulating layer of the invention can surround the elongated electrically conductive element.

The semi-conductive layer can surround the electrically insulating layer. The semi-conductive layer can then be an external semi-conductive layer.

The electrically insulating layer can surround the semi-conductive layer. The semi-conductive layer can then be an internal semi-conductive layer.

The electrically insulating layer is preferably made of a thermoplastic polymer material, and particularly preferably obtained from a polymer composition comprising at least one polypropylene-based thermoplastic polymer material as defined in the invention.

According to a preferred embodiment of the invention, the electric cable comprises several semi-conductive layers surrounding the elongated electrically conductive element, at least one of the semi-conductive layers being as defined in the invention (or being obtained from a polymer composition as defined in the invention).

According to a particularly preferred embodiment of the invention, the cable includes:

at least one elongated electrically conductive element, in particular positioned in the centre of the cable, a first semi-conductive layer surrounding the elongated electrically conductive element, an electrically insulating layer surrounding the first semi-conductive layer, and a second semi-conductive layer surrounding the electrically insulating layer, at least one of the semi-conductive layers, and preferably both semi-conductive layers, being as defined in the invention (or being obtained from a polymer composition as defined in the invention).

The electrically insulating layer can be as defined in the invention.

In a particular embodiment, the first semi-conductive layer, the electrically insulating layer and the second semi-conductive layer constitute a three-layer insulation. In other words, the electrically insulating layer is in direct physical contact with the first semi-conductive layer, and the second semi-conductive layer is in direct physical contact with the electrically insulating layer.

The cable can also include an outer protective sheath surrounding the second semi-conductive layer and can be in direct physical contact with it.

The outer protective sheath can be an electrically insulating sheath.

The electric cable can also include an electric (e.g. metal) shield surrounding the second semi-conductive layer. In this case, the electrically insulating sheath surrounds said electric shield and the electric shield is between the electrically insulating sheath and the second semi-conductive layer.

This metal shield can be a "wire" shield composed of a set of copper or aluminium conductors arranged around and along the second semi-conductive layer, a "banded" shield composed of one or more conductive metal strips made of copper or aluminium, optionally laid in a helix around the second semi-conductive layer, or a conductive metal strip made of aluminium laid longitudinally around the second semi-conductive layer and sealed with glue in the overlapping areas of parts of said strip, or a "sealed" shield of the metal tube type optionally made of lead or lead alloy and surrounding the second semi-conductive layer. This last type of shield is used to protect against moisture that tends to penetrate the electric cable in a radial direction.

The metal shield of the electric cable of the invention can include a "wire" shield and a "sealed" shield or a "wire" shield and a "banded" shield.

All types of metal shields can act as earthing devices for the power cable and can thus carry fault currents, for example in the event of a short circuit in the network concerned.

Other layers, such as layers that swell the presence of moisture, can be added between the second semi-conductive layer and the metal shield, these layers ensuring the longitudinal watertightness of the electric cable.

The cable of the invention concerns more particularly the field of electric cables operating in direct current (DC) or alternating current (AC).

The electric cable conforming to the first subject of the invention can be obtained by a process comprising at least one step 1) of extruding the polymer composition as defined in the first subject of the invention around an elongated electrically conductive element, to obtain an (extruded) semi-conductive layer surrounding said elongated electrically conductive element.

Step 1) can be carried out by techniques well known to the skilled person, for example using an extruder.

In step 1), the composition at the extruder exit is called "non-crosslinked", the temperature and the implementation time within the extruder thus being optimized accordingly.

At the extruder exit, an extruded layer is thus obtained around said electrically conductive element, which is optionally in direct physical contact with said elongated electrically conductive element.

The process preferably does not include a step of crosslinking the layer obtained in step 1).

The electrically insulating layer and/or the semi-conductive layer(s) of the electric cable of the invention can be obtained by successive extrusion or by co-extrusion.

Prior to the extrusion of each of these layers around at least one elongated electrically conductive element, all the components necessary for the formation of each of these layers can be metered and mixed in a continuous mixer of type BUSS co-kneader, twin-screw extruder or another type of mixer suitable for polymer mixtures, in particular filled. The mixture can then be extruded in the form of rods, then cooled and dried to form granules, or the mixture can be put directly into the form of granules, using techniques well known to the skilled person. These granules can then be introduced into a single-screw extruder to extrude and deposit the composition around the elongated electrically conductive element to form the layer in question.

The different compositions can be extruded one after the other to successively surround the elongated electrically conductive element, and thus to form the different layers of the electric cable of the invention.

They can alternatively be extruded concomitantly by co-extrusion using a single extruder head, co-extrusion being a process well known to the skilled person.

Whether in the granule formation step or in the cable extrusion step, the operating conditions are well known to the skilled person. In particular, the temperature within the mixing or extrusion device can be higher than the melting temperature of the majority polymer or of the polymer with the highest melting temperature among the polymers used in the composition to be implemented.

BRIEF DESCRIPTION OF THE DRAWINGS

FIG. 1 shows a schematic view of an electric cable according to a preferred embodiment in accordance with the invention.

For reasons of clarity, only the elements essential for understanding the invention have been represented schematically, and this not to scale.

DETAILED DESCRIPTION

The medium- or high-voltage electric cable 1 conforming to the first subject of the invention, shown in FIG. 1, comprises a central elongated electrically conductive element 2, in particular of copper or aluminium. The electric cable 1 further comprises several layers arranged successively and coaxially around this central elongated electrically conductive element 2, namely: a first semi-conductive layer 3 known as the "internal semi-conductive layer", an electrically insulating layer 4, a second semi-conductive layer 5 known as the "external semi-conductive layer", a metal shield 6 for earthing and/or protection, and an outer protective sheath 7.

The electrically insulating layer 4 is an extruded thermoplastic (i.e. non-crosslinked) layer.

The semi-conductive layers 3 and 5 are thermoplastic (i.e. non-crosslinked) extruded layers obtained from the polymer composition as defined in the invention.

The presence of the metal shield 6 and the outer protective sheath 7 is preferential, but not essential, as this cable structure per se is well known to the skilled person.

EXAMPLES

1. Polymer Compositions

Compositions I1 and I2 according to the invention, i.e. comprising at least one polypropylene-based thermoplastic polymer material, at least one first antioxidant, and at least one metal deactivator, were compared to comparative compositions C1, C2 and C3, the composition C1 corresponding to a composition comprising a polypropylene-based thermoplastic polymer material, but not comprising a first antioxidant, and a metal deactivator; and the compositions C2 and C3 comprising a polypropylene-based thermoplastic polymer material and, a metal deactivator or a first antioxidant.

Table 1 below lists the above-mentioned polymer compositions in which the amounts of the compounds are expressed as percentages by weight, based on the total weight of the polymer composition.

TABLE 1

| Polymer compositions | C1 (*) | C2 (*) | C3 (*) | I1 | I2 |
|---|---|---|---|---|---|
| random propylene copolymer | 51.61 | 51.06 | 51.06 | 51.06 | 50.79 |
| heterophasic propylene copolymer | 10.75 | 10.64 | 10.64 | 10.64 | 10.58 |
| linear low-density polyethylene | 10.75 | 10.64 | 10.64 | 10.64 | 10.58 |
| conductive filler | 26.89 | 26.60 | 26.60 | 26.60 | 26.46 |
| metal deactivator | 0.00 | 0.00 | 1.06 | 0.35 | 0.53 |
| first antioxidant | 0.00 | 0.00 | 0.00 | 0.71 | 0.53 |
| second antioxidant | 0.00 | 1.06 | 0.00 | 0.00 | 0.53 |

(*) Comparative compositions not forming part of the invention

The origin of the compounds in Table 1 is as follows:
random propylene copolymer marketed by Borealis with the product name Bormed RB 845 MO;
heterophasic propylene copolymer marketed by Lyondell-Basell Industries with the product name Adflex® Q 200F;
linear low-density polyethylene marketed by ExxonMobil Chemicals with the product name LLDPE 1002 YB;
conductive filler: carbon black marketed by Cabot with the product name Vulcan XC-500;
metal deactivator: 1,2-bis(3,5-di-tert-butyl-4-hydroxyhydrocinnamoyl) hydrazine (Irganox® 1024 or Irganox® MD 1024) marketed by BASF;
first antioxidant: pentaerythritol tetrakis(3-(3,5-di-tert-butyl-4-hydroxyphenyl)propionate) (Irganox® 1010) marketed by BASF; and
second antioxidant: polymerized 2,2,4-trimethyl-1,2-dihydroquinoline (TMQ) marketed by Addivant with the product name Naugard Super Q for the composition C2; and tris(2,4-di-tert-butyl-phenyl)phosphite (Irgafos® 168) marketed by BASF for the compositions I1 and I2.

2. Preparation of Non-Crosslinked Layers and Cables

The compositions listed in Table 1 are implemented as follows.

The polymer components for forming the polypropylene-based thermoplastic polymer material as defined in the invention are metered for each of the compositions described above by loss-in-weight feeders in a continuous mixer. The polymer components are melted and then the conductive filler is added to the mixture of molten polymer components. The continuous mixer can be of the single-screw oscillating rotary co-kneader ("BUSS") type, a twin-screw extruder, or any other mixer allowing a good dispersion and distribution of the conductive filler within the polypropylene-based thermoplastic polymer material.

The resulting mixture in molten form is then extruded into rods, which are cooled, for example, in an elongated tank containing cold water. The rods, once cooled, are transformed into granules.

For each of the compositions C2, C3, I1, and I2, the granules obtained previously are then introduced into a single-screw extruder equipped with a loss-in-weight feeder to meter them; and a very-high-precision loss-in-weight feeder to meter the first antioxidant, the second antioxidant, and/or the metal deactivator. The various components are melted, then the resulting mixture in the molten form is extruded into rods, which are cooled. The rods, once cooled, are transformed into granules.

These granules for each of the compositions C1, C2, C3, C3, I1 and I2 can then be transformed into compression-moulded plates using a suitable mould and a heated hydraulic press, or transformed into strips using a single-screw extruder, typically with a thickness of about 1 mm, and a width of about 15 mm. Once cooled, these strips can be used to cut H2 dumbbell samples with a punch. The dumbbell samples are then used to test the mechanical properties, using a traction machine well known in the prior art, of the compositions as described above in their initial state, or after thermal ageing in air, for example in an oven. Each result represents the average value of at least 5 individual results each from a tested H2 sample. The tensile speed during mechanical tests is 25 mm/minute.

The thermal ageing conditions selected are as follows: duration of about 240 hours (10 days), and isothermal and constant temperature of about 135° C.

Tensile strength (TS) and elongation at break (EB) tests were carried out on materials in accordance with NF EN 60811-1-1, using an apparatus marketed under the product number 3345 by Instron.

The results of each of these tests are reported in Table 2 (mechanical properties) below:

TABLE 2

| Properties | C1 (*) | C2 (*) | C3 (*) | I1 | I2 |
|---|---|---|---|---|---|
| TS (MPa) | 21.7 | 21.4 | 22.0 | 22.0 | 20.1 |
| EB (%) | 421 | 449.5 | 435.6 | 417.4 | 411.5 |
| TS after ageing (MPa) | 6.4 | 15.8 | 18.3 | 16.9 | 14.7 |
| EB after ageing (%) | 6.7 | 160.3 | 126.1 | 287.5 | 277.6 |

(*) Comparative compositions not forming part of the invention

All these results show that the presence of a first antioxidant and a metal deactivator in a polypropylene-based semi-conductive layer improves temperature ageing resistance. Without this combination of a first antioxidant and a metal deactivator, tensile strength and elongation at break drop during thermal ageing.

The invention claimed is:
1. Electric cable comprising:
at least one elongated electrically conductive element; and
at least one semi-conductive layer surrounding said elongated electrically conductive element,
wherein the semi-conductive layer is obtained from a polymer composition comprising at least one polypropylene-based thermoplastic polymer material, at least one first antioxidant,
and at least one metal deactivator,
wherein the semi-conductive layer is a non-crosslinked layer,
wherein the polymer composition further comprises a dielectric liquid
wherein the polypropylene-based thermoplastic polymer material comprises an amount of less than 10% by weight of polar polymer(s), with respect to the total weight of the polypropylene-based thermoplastic polymer material.
2. Electric cable according to claim 1, wherein the first antioxidant is selected from hindered phenols, aromatic amines, and nitrogen-containing aromatic heterocyclics.
3. Electric cable according to claim 1, wherein the polymer composition comprises at least 0.3% by weight of the first antioxidant, based on the total weight of the polymer composition.
4. Electric cable according to claim 1, wherein the metal deactivator is selected from nitrogen-containing aromatic heterocycles, and aromatic compounds comprising at least one function —NH—C(=O)—.
5. Electric cable according to claim 1, wherein the polymer composition comprises at least 0.2% by weight of the metal deactivator, based on the total weight of the polymer composition.
6. Electric cable according to claim 1, wherein the polymer composition comprises at least 6% by weight of conductive filler, based on the total weight of the polymer composition.
7. Electric cable according to claim 1, wherein the polypropylene-based thermoplastic polymer material comprises a propylene copolymer $P_1$.
8. Electric cable according to claim 7, wherein the polypropylene-based thermoplastic polymer material comprises a random propylene copolymer or a heterophasic propylene copolymer, as propylene copolymer $P_1$.
9. Electric cable according to claim 1, wherein the polypropylene-based thermoplastic polymer material comprises a random propylene copolymer and a heterophasic propylene copolymer, or two different heterophasic propylene copolymers.
10. Electric cable according to claim 1, wherein the polypropylene-based thermoplastic polymer material can further comprise an olefin homopolymer or copolymer $P_2$.
11. Electric cable according to claim 1, wherein the polypropylene-based thermoplastic polymer material comprises at least 50% by weight of propylene polymer(s), based on the total weight of the polypropylene-based thermoplastic polymer material.
12. Electric cable according to claim 1, wherein the polymer composition further comprises a second antioxidant different from the first antioxidant.
13. Electric cable according to claim 12, wherein the polymer composition comprises at least 0.2% by weight of the second antioxidant, based on the total weight of the polymer composition.
14. Electric cable according to claim 1, wherein the semi-conductive layer has a reduction in tensile strength after temperature ageing of at most 40%.
15. Electric cable according to claim 1, wherein the semi-conductive layer has a reduction in elongation at break after temperature ageing of at most 50%.

16. Electric cable according to claim 1, wherein said electric cable further comprises an electrically insulating layer.

17. Electric cable according to claim 1, wherein the dielectric liquid includes a mineral oil.

* * * * *